C. F. RUMOLD.
AUTOMATIC TWO FLUID CUT-OFF.
APPLICATION FILED MAY 20, 1911.
1,051,768.
Patented Jan. 28, 1913.
2 SHEETS—SHEET 2.
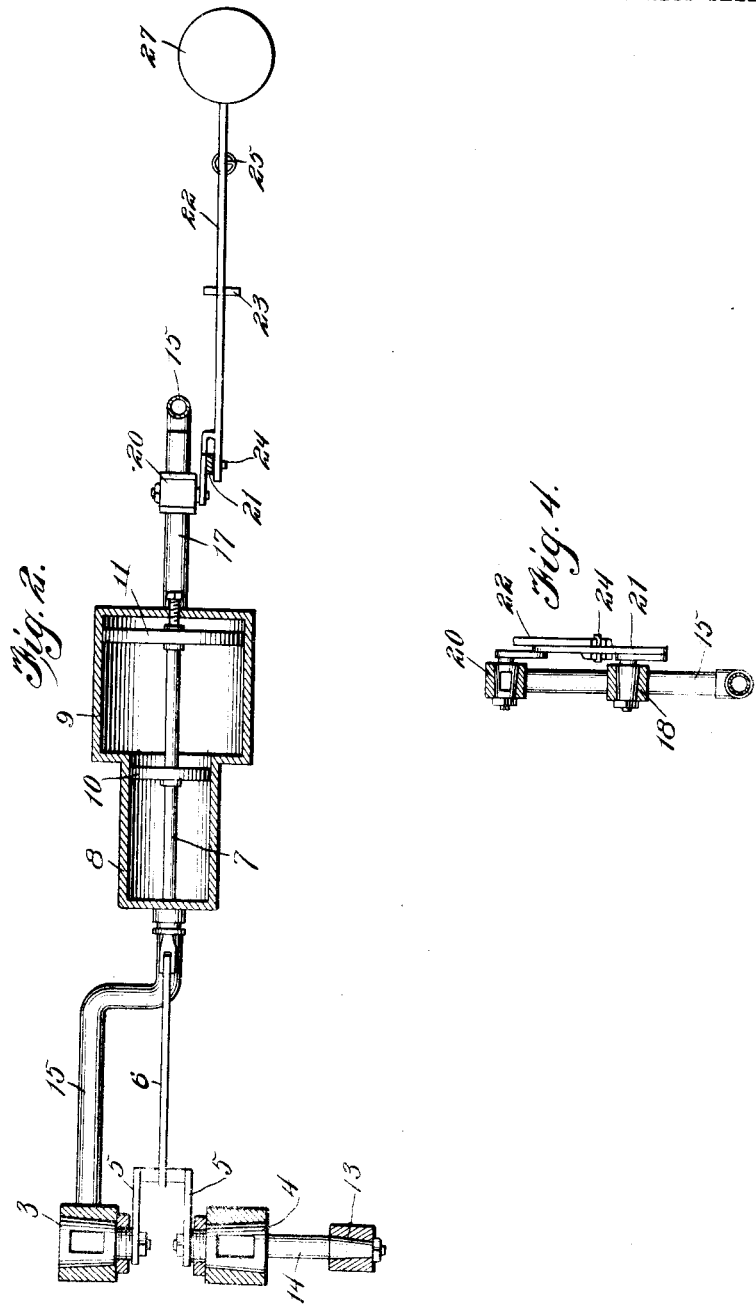
Witnesses
Louis R. Heinrichs
V. B. Hillyard
Inventor
Christian F. Rumold
By Victor J. Evans
Attorney

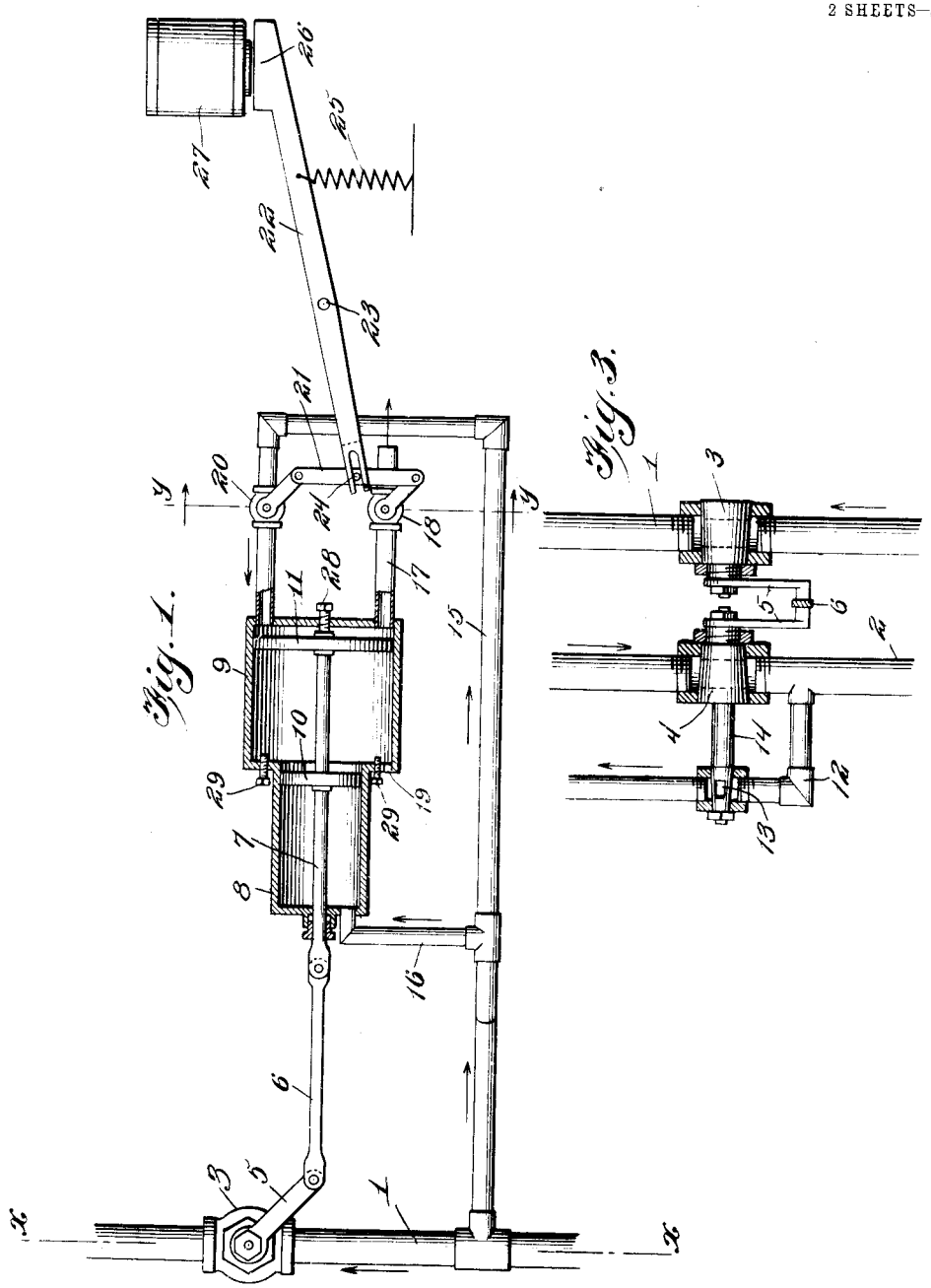

UNITED STATES PATENT OFFICE.

CHRISTIAN F. RUMOLD, OF BEREA, KENTUCKY.

AUTOMATIC TWO-FLUID CUT-OFF.

1,051,768. Specification of Letters Patent. Patented Jan. 28, 1913.

Application filed May 20, 1911. Serial No. 628,487.

*To all whom it may concern:*

Be it known that I, CHRISTIAN F. RUMOLD, a citizen of the United States, residing at Berea, in the county of Madison and State of Kentucky, have invented new and useful Improvements in Automatic Two-Fluid Cut-Offs, of which the following is a specification.

The present invention provides novel means for controlling the flow of fluid through a plurality of pipes or conductors, the mechanism embodying valves, valve gear and differential pistons and cylinders therefor, the fluid being controlled in its admission to the cylinder of larger diameter by a mechanism governed in its action by varying conditions.

The invention specifically considered is designed for use in a system of automatic train control for setting the brakes and cutting off the supply of steam to the engine, the controlling mechanism being located in the length of the pipe by means of which the steam, or motive medium, is supplied to the engine.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a central longitudinal section of a cut-off embodying the invention. Fig. 2 is a horizontal section of the cut-off. Fig. 3 is a section on the line $x$—$x$ of Fig. 1. Fig. 4 is a section on the line $y$—$y$ of Fig. 1, looking in the direction of the arrows.

Corresponding and like parts are referred to in the following description, and indicated in all the views of the drawings, by the same reference characters.

The numerals 1 and 2 designate two pipes, passages or conductors through which the fluid such as steam, compressed air, water or the like is adapted to flow. Valves 3 and 4 are located in the length of the pipes 1 and 2 in line so as to be simultaneously operated. The valves 3 and 4 are of the type embodying turning plugs. Levers 5 are connected to the turning plugs of the valves 3 and 4 and are joined at their outer ends to form in effect a crank. A rod 6 is connected at one end to the crank 5 and its opposite end is attached to a piston rod 7 arranged to operate in cylinders 8 and 9 and having pistons 10 and 11 attached thereto of different diameters. A vent pipe 12 connects with the pipe 2 and is provided in its length with a valve 13, which is in line with the valves 3 and 4 and has its stem 14 connected to or forming part of the stem of the valve 4. The fluid flows through the several pipes 1, 2 and 12 in the direction indicated by the arrows and when the valve 3 is moved to interrupt communication through the pipe 1 the valve 4 is at the same time moved to shut off the flow of the fluid through the pipe 2. When the valve 4 is closed the valve 13 is open and vice versa. When the flow through the pipe 2 is cut off by means of the valve 4 the fluid in the pipe 2 which has passed by the valve 4 is afforded an outlet through the pipe 12, since the valve 13 is open, thereby relieving the pressure in that part of the pipe 2 and in the part to which said pipe is connected.

The cylinders 8 and 9 are of such diameters as to receive the respective pistons 10 and 11 which are arranged to operate therein. A pipe 15 connects the pipe 1 with the outer end of the cylinder 9 and a branch pipe 16 connects said pipe 15 with the outer end of the cylinder 8. It will thus be understood that the pressure supplied to the outer ends of the cylinders 8 and 9 is the same and by reason of the increased area of the piston 11 the pressure of the fluid exerted on said piston is in excess of the pressure exerted on the piston 10, hence the two pistons 10 and 11 move toward the left, thereby moving the valves 3, 4 and 13 to shut off the flow of fluid through the pipes 1 and 2. A vent pipe 17 leads from the outer end of the cylinder 9 and is provided with a valve 18. The inner end of the cylinder 9 has a vent opening 19, thereby preventing any back pressure upon the opposing faces of the pistons 10 and 11, since the inner ends of the cylinders 8 and 9 are at all times in communication. A valve 20 is located in the length of the pipe 15. A rod or bar 21 connects arms attached to the valves 18 and 20 so as to move both valves simultaneously. When the valve 20 is closed the valve 18 is open and vice versa. When the valve 20 is closed the valve 18 is open to admit of the fluid contained in the outer end of the cylinder 9 escaping so that the pressure of the fluid exerted upon the piston 10 moves the latter inward, thereby opening the valves 3 and 4. A lever 22 pivoted at 23 has one arm in engagement with the rod or bar 21, said arm being forked and having the fork members embracing the part 21 and longitudinally slotted to receive the ends of a pin 24, which projects beyond opposite sides of the bar 21. A spring 25 exerts a downward pull upon the outer end of the lever 22. An armature 26 is carried by the outer end of the lever 22 and is adapted to be attracted by means of an electro-magnet 27 when the latter is energized. The forces exerted by the parts 25 and 27 are in opposition and when the electro-magnet is energized it attracts the armature 26 and moves the lever 22 against the tension of the spring 25 and when the electro-magnet 27 is de-energized the lever 22 is moved by the spring 25. When the lever 22 is moved in one direction the valves 18 and 20 are simultaneously moved in a given direction and when the lever 22 moves in the opposite direction said valves 18 and 20 are caused to move in the opposite direction.

In the operation of the cut-off the opening of the valve 20 at the same time closes the valve 18 and admits pressure into the outer end of the cylinder 9, with the result that the pistons 10 and 11 are moved to the left, but when the valve 20 is closed and the valve 18 simultaneously opened the pistons 10 and 11 are moved to the right in the cylinders 8 and 9. Movement of the pistons produces a corresponding movement of the rod 6 and a turning of the valves 3, 4 and 13 in the manner hereinbefore stated. When the pistons occupy a position at the right hand end of the cylinders the valves 3 and 4 are open and the valve 13 closed and when the pistons 10 and 11 are moved to occupy a position at the left hand end of the cylinders the valves 3 and 4 are closed and the valve 13 opened. The pipes 15 and 16 being in communication with the pipe 1 are at all times supplied with fluid under pressure. A set screw 28 is fitted to the outer end of the larger cylinder to limit the movement of the pistons in one direction. Set screws 29 are fitted to the inner end of the larger cylinder to limit the movement of the pistons in the opposite direction.

The pipe 1 supplies steam from the boiler to the engine and when the valve 3 is closed the steam is cut off from the engine. The pipe 15 connects with the pipe 1 at a point between the valve 3 and the boiler, hence steam is supplied at boiler pressure to the pipe 15 at all times. The pipe 2 connects the source of compressed air supply with the train pipe of the train of cars through which air pressure is supplied to the brake cylinder. When the valve 4 is closed the supply of air is cut off from the brake cylinder and the latter is bled or relieved of pressure through the pipe 12 by the opening of the valve 13, it being remembered that the pipe 12 connects with the pipe 2 at a point between the valve 4 and the brake cylinder.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

The valves 18 and 20 and adjunctive parts may be located in any relative position and at any distance from the cylinders. In some instances it may be desirable to provide a cross-head for the piston rod 7.

Having thus described the invention what is claimed as new, is:—

1. In a fluid cut-off the combination of a main pipe, two cylinders of different diameters having a tandem arrangement and provided at their inner ends with a vent common to both, connected pistons arranged to operate within the cylinders, a branch pipe connecting the main pipe with the outer end of the larger cylinder, a second pipe connecting the branch pipe with the outer end of the smaller cylinder, a valve in the length of the main pipe connected with the said pistons and operated thereby, a second valve at a point in the length of the branch pipe between the larger cylinder and the said second pipe, a valve controlled vent connected with the outer end of the larger cylinder, means connecting the said second valve with the valve of the vent for simultaneous movement, and controlling means for automatically moving the last mentioned valves.

2. A fluid cut-off comprising alining cylinders of different diameters having a vent at their inner ends common to both, connected pistons arranged to operate in the cylinders, a pipe having connection with the outer end of the larger cylinder for supplying fluid pressure thereto, a valve in the length of said pipe, a branch pipe connecting the first mentioned pipe with the outer end of the smaller cylinder, a supply pipe having connection with the first mentioned pipe, a valve in the length of the supply pipe, a second supply pipe, a valve in the length of said second supply pipe, means for connecting the valves of the said supply pipes with the pistons, a vent pipe having connection with the said second supply pipe, a valve in the length of the vent pipe having connection with the valves of the supply pipes to open the vent when the valves of the said supply pipes are moved into closed position, a vent pipe having connection with the outer end of the larger cylinder, a valve in the length of the last mentioned vent pipe, means connecting the valve of the last mentioned vent pipe with the valve of the first mentioned pipe, and controlling means for simultaneously operating the two last mentioned valves.

3. In a fluid cut-off the combination of differential cylinders having a vent common to both, connected pistons arranged to operate within the cylinders, a supply pipe, a branch pipe connecting the supply pipe with the outer end of the larger cylinder, a second branch pipe connecting the first named branch pipe with the outer end of the smaller cylinder, a valve in the length of the first mentioned branch pipe for controlling the supply of fluid pressure to the larger cylinder, a vent pipe having connection with the outer end of the larger cylinder, a valve in the length of the vent pipe, connecting means between the valves of the branch and vent pipes, controlling means for simultaneously operating the two valves, a second supply pipe, valves in the length of the supply pipes, means connecting the valves of the supply pipes with the pistons, a vent pipe leading from the said second supply pipe, and a valve in the length of the last mentioned vent pipe having connection with the valves of the supply pipes to move therewith.

In testimony whereof I affix my signature in presence of two witnesses.

CHRISTIAN F. RUMOLD.

Witnesses:
JOHN E. CALFEE,
FRANCIS O. CLARK.